Patented June 10, 1930

1,762,531

UNITED STATES PATENT OFFICE

WINFIELD SCOTT, OF NITRO, WEST VIRGINIA, ASSIGNOR TO THE RUBBER SERVICE LABORATORIES COMPANY, OF AKRON, OHIO, A CORPORATION OF OHIO

PROCESS FOR VULCANIZING RUBBER AND PRODUCTS OBTAINED THEREBY

No Drawing.   Application filed January 5, 1928. Serial No. 244,773.

This invention relates to processes for vulcanizing rubber and products obtained thereby. It is more particularly directed to the process for vulcanizing rubber in the presence of an organic accelerator and products obtained thereby.

According to the present invention it has been found that the reaction products of dialkylene thiuram disulfides and straight chain aldehydes form a valuable group of vulcanization accelerators.

One procedure whereby the desired accelerator may be obtained is as follows:

Allyl amine was treated with carbon disulfide. To the reaction product was added an alcoholic solution of iodine or other suitable halogen. The diallyl thiuram disulfide thus formed was reacted with butylaldehyde to form a reaction product, which constitutes one of my preferred type of rubber accelerators. Other dialkylene thiuram disulfides such as dibutylene thiuram disulfide have been found to react with butylaldehyde and other straight chain aldehydes such as aldol and acetaldehyde in a similar manner.

Preferably the new type of accelerator, the use of which is disclosed herein, comprises compounds which it is believed possess the following general formula:

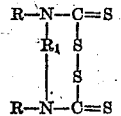

wherein R represents an alkylene grouping and $R_1$ represents an alkylidene grouping.

The preferred product was readily manufactured by reacting approximately two molecular proportions of allylamine with a slight excess over one molecular proportion of carbon bisulfid. The reaction was carried out in the presence of a suitable solvent, in this case ether. After the mixture had stood for a short time, crystals of the diallylamine salt of diallyl-dithiocarbamic acid settled out in accordance with the following reaction:

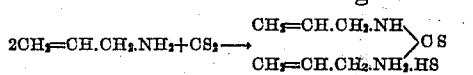

The product was then dissolved in water to which was added a small amount of an alcoholic solution of iodine. Crystals of diallyl-thiuram disulfid, possessing the formula

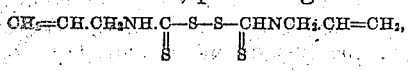

separated in leaflets from the water. The mass was filtered and the crystals were dried. The dried product was then maintained for several hours at a temperature preferably between 50 to 60° C. in contact with an equimolecular proportion of butylaldehyde, whereupon a brownish red syrup was formed which was most probably butyl-diallyl thiuram disulfid possessing the following structure:

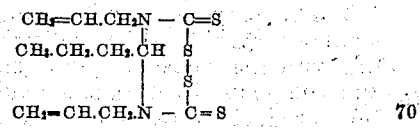

In carrying out the invention in its preferred form, a rubber mix comprising 100  parts of pale crepe rubber,
  5  parts of zinc oxide,
  3.5 parts of sulfur, was prepared in the wall known manner, and to this mix 0.5 parts of one of my new type of accelerators, for example the reaction product of diallyl thiuram disulfide and butylaldehyde was incorporated therein. The resulting rubber compound was then vulcanized. The following table shows the results of the tensile tests obtained by testing sheets of rubber vulcanized in a press for different periods of time at the temperatures obtained from 20 and 40 pounds of steam pressure per square inch.

| Time of cure | Pressure lbs. | Lbs./in² 300% | Modulus of elasticity in— | | Tensile at break | Elongation at break |
|---|---|---|---|---|---|---|
| | | | At elongations of— | | | |
| | | | 500% | 700% | | |
| Minutes | Steam | | | | | Per cent |
| 60 @ | 20 | 240 | 513 | 2235 | 3960 | 840 |
| 30 @ | 20 | 161 | 312 | 1038 | 3065 | 885 |
| 45 @ | 40 | 318 | 352 | 3715 | 4115 | 740 |
| 30 @ | 40 | 295 | 777 | 3270 | 4185 | 770 |
| 15 @ | 40 | 234 | 535 | 2240 | 3605 | 785 |

The example set forth is to be understood as illustrative only and not at all limitative of the invention. Other types of rubber compounds wherein other compounding ingredients or other proportions of such ingredients are employed, are readily manufactured and are apparent to those skilled in the art to which the invention pertains.

The invention furthermore is not limited by any theory advanced in explanation of the changes taking place in the manufacture of the products set forth but is limited solely by the claims attached hereto as a part of this specification wherein it is intended to claim the invention as broadly as possible in view of the prior art.

What is claimed is:

1. The process of vulcanizing rubber or similar material, which comprises combining with the rubber a vulcanizing agent and the reaction product of butylaldehyde and a dialkylene substitution derivative of thiuram disulfide as an accelerator and subjecting the mixture to a vulcanizing temperature.

2. The process of vulcanizing rubber or similar material, which comprises combining with the rubber a vulcanizing agent and the reaction product of butylaldehyde and diallyl thiuram disulfide as an accelerator, and subjecting the mixture to a vulcanizing temperature.

3. The process of vulcanizing rubber or similar material, which comprises combining with the rubber a vulcanizing agent, a zinc compound, such as zinc oxide, the reaction product of butylaldehyde and diallyl thiuram disulfide as an accelerator, and subjecting the mixture to a vulcanizing temperature.

4. A vulcanized rubber obtained by combining with the rubber a vulcanizing agent and the reaction product of butylaldehyde and a dialkylene substitution derivative of thiuram disulfide as an accelerator and subjecting the mixture to a vulcanizing temperature.

5. A vulcanized rubber obtained by combining with the rubber a vulcanizing agent and the reaction product of butylaldehyde and diallyl thiuram disulfide and subjecting the mixture to a vulcanizing temperature.

6. A vulcanized rubber obtained by combining with the rubber a vulcanizing agent, a zinc compound, such as zinc oxide, the reaction product of butylaldehyde and diallyl thiuram disulfide as an accelerator and subjecting the mixture to a vulcanizing temperature.

In testimony whereof I hereunto affix my signature.

WINFIELD SCOTT.